(12) United States Patent
Vogt

(10) Patent No.: US 7,628,016 B2
(45) Date of Patent: Dec. 8, 2009

(54) METHOD OF EFFECTING MULTISTAGE SUPER-CHARGING IN INTERNAL COMBUSTION ENGINES

(75) Inventor: Guenther Vogt, Holzkirchen (DE)

(73) Assignee: Robert Bosch, GmbH, Stuttgart (DE)

( * ) Notice: Subject to any disclaimer, the term of this patent is extended or adjusted under 35 U.S.C. 154(b) by 0 days.

(21) Appl. No.: 11/199,968

(22) Filed: Aug. 9, 2005

(65) Prior Publication Data

US 2006/0054133 A1 Mar. 16, 2006

(30) Foreign Application Priority Data

Sep. 16, 2004 (DE) ................... 10 2004 044 819

(51) Int. Cl.
*F02B 33/44* (2006.01)
*F02B 37/013* (2006.01)
*F16K 15/06* (2006.01)

(52) U.S. Cl. .............. 60/612; 137/220; 137/514.5; 137/515.5; 137/536

(58) Field of Classification Search ............ 60/612; 425/563; 137/454.2, 71, 542, 514.5, 514.7, 137/220, 543, 515.5, 536; *F02B 37/007, F02B 37/013, 37/00, 37/04*
See application file for complete search history.

(56) References Cited

U.S. PATENT DOCUMENTS

| | | | | |
|---|---|---|---|---|
| 666,245 | A * | 1/1901 | Ginaca | 137/543 |
| 1,111,319 | A | 9/1914 | Paulsmeier | 137/514.5 |
| 1,802,720 | A | 4/1931 | Junkers | 137/536 |
| 2,602,631 | A | 7/1952 | Eickmeyer | 137/515.5 |
| 2,729,238 | A | 1/1956 | Hite | 137/542 |
| 2,809,660 | A | 10/1957 | Becker | 137/543.15 |
| 2,870,779 | A * | 1/1959 | Thomiszer | 137/542 |
| 2,919,714 | A * | 1/1960 | Mrazek | 137/220 |
| 3,194,255 | A * | 7/1965 | Flaton et al. | 137/514.7 |
| 3,359,998 | A | 12/1967 | Fike | 137/543.15 |
| 3,552,426 | A | 1/1971 | Hester et al. | 137/543.13 |
| 3,586,033 | A * | 6/1971 | Hieber | 137/514.7 |
| 3,605,802 | A | 9/1971 | Hertell | 137/514.5 |

(Continued)

FOREIGN PATENT DOCUMENTS

DE 4434776 A1 * 4/1996

(Continued)

OTHER PUBLICATIONS

A translation of Heinl et al. (Pub. No. EP 1387058 A2).*

(Continued)

*Primary Examiner*—Thai Ba Trieu
(74) *Attorney, Agent, or Firm*—Baker & Daniels LLP

(57) ABSTRACT

A method of effecting multi-stage supercharging in internal combustion machines comprising a supercharging system, wherein fresh air is first routed through a low-pressure compressor. At least a portion of the compressed air stream is compressed further in a high-pressure compressor, and the rest of the fresh air compressed in the low-pressure compressor is routed around the high-pressure compressor via a compressor bypass. All the fresh air is ultimately delivered to the internal combustion engine. The compressor bypass is opened or closed by a self-actuating valve in dependence on the differential pressure, the compressor bypass opening as soon as the pressure downstream from the high-pressure compressor is lower than the pressure upstream of the high-pressure compressor.

6 Claims, 3 Drawing Sheets

U.S. PATENT DOCUMENTS

| | | | |
|---|---|---|---|
| 3,608,150 A * | 9/1971 | Laufer et al. | 425/563 |
| 3,993,093 A | 11/1976 | Mokveld | 137/484.6 |
| 4,148,338 A | 4/1979 | Skoli | 137/515.7 |
| 4,373,544 A | 2/1983 | Goodman et al. | 137/514.5 |
| 4,638,832 A * | 1/1987 | Mokveld | 137/514.5 |
| 4,709,552 A | 12/1987 | Rutschmann et al. | 60/612 |
| 4,747,426 A * | 5/1988 | Weevers | 137/514.7 |
| 4,930,315 A | 6/1990 | Kanesaka | 60/612 |
| 5,065,790 A | 11/1991 | Kornas | 137/514.5 |
| 5,080,122 A * | 1/1992 | Neuzeret | 137/220 |
| 5,199,261 A * | 4/1993 | Baker | 60/612 |
| 5,408,979 A | 4/1995 | Backlund et al. | 60/612 |
| 5,704,391 A * | 1/1998 | McGowan et al. | 137/454.2 |
| 5,782,259 A * | 7/1998 | Ledbetter et al. | 137/71 |
| 5,921,276 A * | 7/1999 | Lam et al. | 137/514.7 |
| 6,427,711 B1 * | 8/2002 | Kemp | 137/454.2 |
| 6,793,480 B2 * | 9/2004 | Dominka | 425/563 |
| 2002/0005217 A1 | 1/2002 | Lyons | 137/220 |
| 2006/0054848 A1 | 3/2006 | Vogt | 251/77 |

FOREIGN PATENT DOCUMENTS

| | | |
|---|---|---|
| DE | 195 14 572 A1 | 10/1996 |
| DE | 195 14 572 C2 | 10/1996 |
| EP | 18838 A1 * | 11/1980 |
| EP | 1275832 A2 * | 1/2003 |
| EP | 1 387 058 A2 | 2/2004 |
| EP | 1519017 A1 * | 3/2005 |
| JP | 55109728 A * | 8/1980 |
| JP | 61200331 A * | 9/1986 |
| JP | 08028287 A * | 1/1996 |
| WO | WO 2004046519 A1 * | 6/2004 |
| WO | WO 2005083244 A1 * | 9/2005 |
| WO | WO 2006050746 A1 * | 5/2006 |

OTHER PUBLICATIONS

Election mailed Jun. 6, 2008 in U.S. Appl. No. 11/199,883 and response thereto filed Sep. 8, 2008.

Office Action mailed Oct. 10, 2008 in U.S. Appl. No. 11/199,883 and Amendment filed Apr. 7, 2009.

* cited by examiner

METHOD OF EFFECTING MULTISTAGE SUPER-CHARGING IN INTERNAL COMBUSTION ENGINES

BACKGROUND OF THE INVENTION

To increase the power of internal combustion engines, exhaust gas turbochargers are used. Due to the large operating range of internal combustion engines in passenger vehicles, the exhaust gas turbocharger must be regulated in order to achieve a set boost pressure. To this end, in a multistage supercharging system (i.e., one with exhaust gas turbochargers connected in series), the fresh air is compressed first in a low-pressure compressor of a first exhaust gas turbocharger and then in a high-pressure compressor of a second exhaust gas turbocharger. When large volumes of fresh air are present, the choke limit of the high-pressure compressor is exceeded. To keep the high-pressure compressor from functioning as a choke in this case, some of the fresh air can be diverted around the high-pressure compressor through a compressor bypass. When the volume of fresh air is below the choke limit of the high-pressure compressor, the compressor bypass is closed.

To keep the pressure build-up in the exhaust gas turbocharger from not lagging when the temperature of the exhaust gas is low and the volume of exhaust gas is very small, as is the case at low rpm, exhaust gas turbochargers of the kind currently used in internal combustion engines have a very low intrinsic mass and therefore respond even at low exhaust flow rates. The power limits of the exhaust gas turbocharger can be broadened for example by regulated two-stage supercharging, as known from Bosch, *Kraftfahrttechnisches Taschenbuch [Automotive Handbook]*, $23^{rd}$ Edition, Vieweg, 1999, pages 445-446. In regulated two-stage supercharging, two exhaust gas turbochargers of different sizes are connected in series. The stream of exhaust gas first flows into an exhaust manifold. From there, the exhaust gas stream is expanded via a high-pressure turbine. When large volumes of exhaust are present, as at high rpm, a portion of the mass flow of the exhaust gas can be diverted around the high-pressure turbine through a bypass. The entire exhaust gas mass flow is then utilized by a low-pressure turbine downstream of the high-pressure turbine. The mass flow of aspirated fresh air is first precompressed by a low-pressure stage and then compressed further in the high-pressure stage. Ideally, the fresh air mass flow is intercooled between the low-pressure stage and the high-pressure stage.

At low engine rpm, i.e., low exhaust gas mass flow rates, the bypass circumventing the high-pressure turbine remains completely closed and the entire exhaust gas mass flow is expanded via the high-pressure turbine. This produces a very rapid and high build-up of boost pressure. As the rpm increases, the expansion work is continuously shifted to the low-pressure turbine by virtue of a corresponding increase in the cross section of the bypass. Thus, regulated two-stage supercharging permits infinitely variable adjustment to engine demands on the turbine and compressor side. Due to the decreasing flow of exhaust gas through the high-pressure turbine, the compressor power of the high-pressure compressor also decreases. When large fresh air mass flows are present, the compression is done by the low-pressure compressor alone. Fresh air does flow through the high-pressure compressor, but the pressure before and after the high-pressure compressor is the same. As soon as the choke limit of the high-pressure compressor is exceeded, that is, once the stream of fresh air flowing through the high-pressure compressor exceeds the volume flow that the high-pressure compressor can handle without pressure loss, the high-pressure compressor acts as a choke and the pressure of the fresh air decreases as it flows through the high-pressure compressor. To keep the choke limit from being exceeded, when fresh air mass flow rates are high, a portion of the fresh air is diverted around the high-pressure compressor through a compressor bypass. The compressor bypass contains a valve that closes or opens the bypass. This valve is currently controlled by means of an external control unit.

A sequence valve for sequential supercharging using two exhaust gas turbochargers is known from *ATZ Automobiltechnische Zeitschrift* 88 (1986), page 268. At low rpm, the sequence valve initially causes the fresh air to bypass one of the two compressors. The second compressor is not tied in until higher rotational speeds are reached. For this purpose, the bypass is made to accommodate a displacement body, the upstream and downstream sides of which are both subjected to a pressure force in the closed state. As long as the pressure force on the downstream side is greater than that on the upstream side, the valve is closed. As soon as the pressure on the upstream and downstream sides is equal, the valve opens. Since the entire displacement body is moved each time, a relatively large mass must be moved in order to open and close the bypass. This makes for relatively slow opening of the valve.

An internal combustion engine provided with supercharging in a high-pressure turbine and a low-pressure stage that is larger than the high-pressure stage is disclosed in DE A [Published German Patent Application] 195 14 572. To obtain the most lag-free supercharging possible, the high-pressure turbine and the low-pressure turbine are initially connected in series. At about 50 to 60% of the rated rpm, the exhaust gas is diverted completely around the high-pressure turbine through a bypass. This consequently simultaneously shuts off the high-pressure compressor, which is driven by the high-pressure turbine and is connected in series to a low-pressure compressor driven by the low-pressure turbine. In this case, the high-pressure compressor is circumvented via a boost-air line that contains a check valve to prevent boost air from flowing back through the boost-air line while the high-pressure compressor is operating. However, DE A 195 14 572 gives no indication of whether the check valve is self-actuating or is controlled from the outside. Nor does the document disclose the differential pressure at which the check valve closes the boost air line.

SUMMARY OF THE INVENTION

In a method of effecting multistage supercharging in an internal combustion engine comprising a supercharging system, fresh air is first routed through a low-pressure compressor. At least a portion of the compressed air stream is compressed further in a high-pressure compressor. The rest of the fresh air compressed in the low-pressure compressor is routed around the high-pressure compressor through a compressor bypass. The compressor bypass is opened or closed by a self-actuating valve in dependence on the differential pressure at the high-pressure compressor, the self-actuating valve being adjusted in the compressor bypass in such a way that it opens as soon as the pressure after the high-pressure compressor is lower than the pressure before the high-pressure compressor. All the fresh air is ultimately delivered to the internal combustion engine.

The fact that the self-actuating valve does not open until the pressure downstream from the high-pressure compressor is lower than the pressure upstream of the high-pressure compressor ensures that the entire air stream is routed through the high-pressure compressor as long as the latter is helping to compress the air. Only when the high-pressure compressor is no longer contributing to air compression, but on the contrary is actually acting as a choke—which occurs as soon as air is being forced through the compressor without the compressor being driven adequately—is the compressor bypass opened to the boost air.

In a preferred embodiment, the self-actuating valve opens when there is a pressure difference of less than 100 mbar. One advantage of the low pressure differential at which the compressor bypass opens is that it prevents kickback or pulsation of the valve body in response to pressure fluctuations. When pressure fluctuations occur, the pressure difference in the high-pressure compressor usually does not fall below 100 mbar, and thus when there are small pressure differences of less than 100 mbar the self-actuating valve remains open even in the presence of pressure fluctuations. A further advantage of the low opening pressure is the ability to utilize both the high-pressure and the low-pressure stages in an optimum manner. This prevents unnecessary pressure losses.

The self-actuating valve comprises, for example, a displacement body accommodated in a valve housing. The displacement body is divided into at least two displacement parts, of which a first displacement part, facing the upstream side, closes or opens the compressor bypass.

In a further embodiment, the self-actuating valve is a flap valve with a return spring.

The advantage of a self-actuating valve for opening or closing the compressor bypass is that there is no need for a valve actuator. It is also unnecessary to implement a valve control function in the control unit.

In a preferred embodiment, the fresh air is cooled in a first heat exchanger downstream of the low-pressure compressor. The fresh air is preferably cooled in a second heat exchanger before entering the internal combustion engine.

The low-pressure compressor used to compress the fresh air is preferably actuated by a low-pressure turbine and the high-pressure compressor by a high-pressure turbine. In this case, the low-pressure turbine and the high-pressure turbine are preferably driven by the stream of exhaust gas leaving the engine. A portion of the exhaust gas can be diverted around the high-pressure turbine through a high-pressure bypass and the low-pressure turbine through a low-pressure bypass. Valves are preferably disposed in both the high-pressure bypass and the low-pressure bypass in order to adjust the volume of exhaust gas circumventing the high-pressure and low-pressure turbines, respectively.

Particularly when the low-pressure compressor and the high-pressure compressor are handling high flow rates of the kind that occur at high rotational speeds, the volume flow in the high-pressure compressor can exceed the delivery limit of the compressor. This causes the high-pressure compressor to act as a choke, and the pressure after the high-pressure compressor to be lower than the pressure before the high-pressure compressor. To keep the volume flow in the high-pressure compressor from becoming greater than the delivery capacity of the high-pressure compressor, a portion of the fresh air can be routed around the high-pressure compressor through the compressor bypass.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
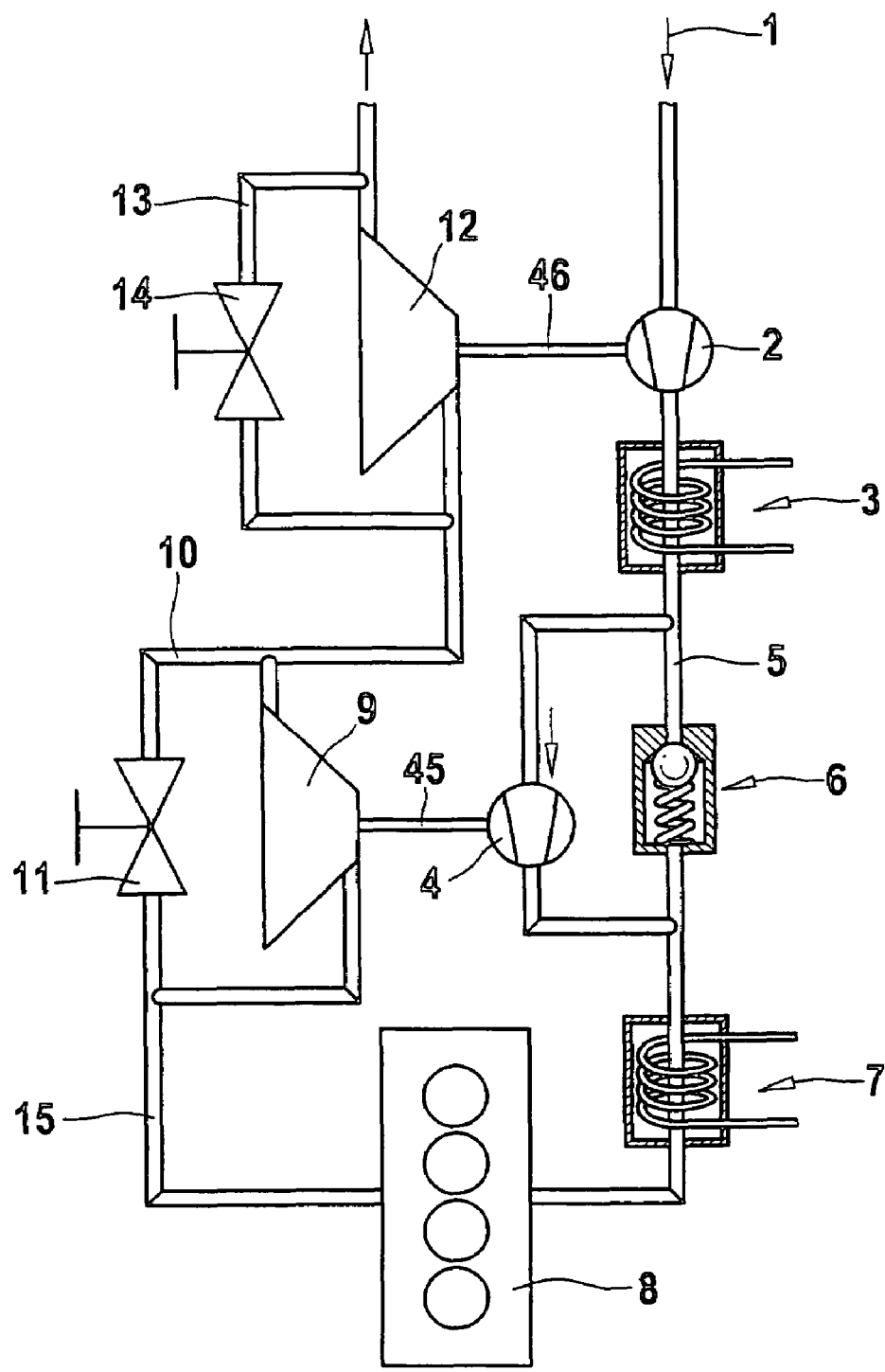
FIG. 1 is a method flow diagram of a two-stage supercharging system.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PREFERRED EMBODIMENTS

FIG. 1 is a flow diagram of a two-stage supercharging system. Fresh air 1 is delivered to a low-pressure compressor 2. In low-pressure compressor 2, the air is compressed to a pressure above the ambient pressure. Since the air heats as it is being compressed, in the embodiment shown in FIG. 1 the low-pressure compressor is followed by a first heat exchanger 3 in which the fresh air 1 compressed by low-pressure compressor 2 is cooled. The heat exchanger 3 can also be omitted, however.

The fresh air 1 compressed in low-pressure compressor 2 is delivered to a high-pressure compressor 4. In high-pressure compressor 4, the air compressed in low-pressure compressor 2 is compressed further. After the fresh air 1 has been compressed in high-pressure compressor 4, the fresh air 1 is delivered to an internal combustion engine 8. Internal combustion engine 8 can be operated on either a self-ignition or a spark-ignition principle. The fresh air 1 is preferably cooled in a second heat exchanger 7 before entering the internal combustion engine 8.

To keep the volume flow through high-pressure compressor 4 from becoming greater than the maximum possible delivery capacity, a compressor bypass 5 branches off in front of high-pressure compressor 4. Compressor bypass 5 is closed by a self-actuating valve 6. Self-actuating valve 6 is implemented, for example, as a check valve that opens as soon as the pressure downstream from the self-actuating valve in the direction of flow becomes lower than the pressure upstream of the self-actuating valve 6. This phenomenon occurs when the volume flow in high-pressure compressor 4 is greater than its maximum delivery capacity. In that case, high-pressure compressor 4 acts as a choke.

High-pressure compressor 4 is preferably driven via a first shaft 45 by a high-pressure turbine 9, which is driven by an exhaust gas stream 15 emitted by the internal combustion engine 8. At low engine speeds, that is, at low mass flows of exhaust gas, high-pressure bypass 10 remains completely closed and the entire mass flow of exhaust gas is expanded via high-pressure turbine 9. This results in a faster and higher build-up of boost pressure. As the rotational speed of the internal combustion engine 8 increases and the mass flow of exhaust gas therefore also increases, the cross section of high-pressure bypass 10 is continuously enlarged by the opening of a first exhaust gas regulating valve 11. Enlarging the cross section of high-pressure bypass 10 reduces the portion of the exhaust gas mass flow acting on high-pressure turbine 9. The power transmitted from high-pressure turbine 9 to high-pressure compressor 4 can be reduced in this way. As the compressor power decreases, fresh air 1 passes through high-pressure compressor 4 without being compressed further. A pressure ratio of $\Pi=1$ becomes established, i.e., the pressure upstream of the high-pressure compressor and downstream from the high-pressure compressor is the same. As soon as the fresh air stream delivered to high-pressure compressor 4 is greater than the maximum delivery capacity of high-pressure compressor 4, high-pressure compressor 4 acts as a choke and the pressure decreases. As soon as the pressure downstream from high-pressure compressor 4 becomes lower than the pressure upstream of high-pressure compressor 4, self-actuating valve 6 opens compressor bypass 5. This causes a portion of the fresh air 1 to flow through compressor bypass 5, and the volume flow through high-pressure compressor 4 adjusts so that the pressure upstream of and downstream from high-pressure compressor 4 is the same.

The opening pressure of self-actuating valve 6 is preferably set at a value Δp<100 mbar. This means that the self-actuating valve opens as soon as the pressure downstream from self-actuating valve 6 is lower than the pressure upstream of self-actuating valve 6 by the opening pressure difference.

Low-pressure compressor 2 is preferably driven via a second shaft 46 by a low-pressure turbine 12. The exhaust gas stream can be diverted around low-pressure turbine 12 through a low-pressure bypass 13 that can be opened or closed by a second exhaust gas regulating valve 14.

First exhaust gas regulating valve 11 and second exhaust gas regulating valve 14 are preferably controlled by an external control unit.

Figure 2:
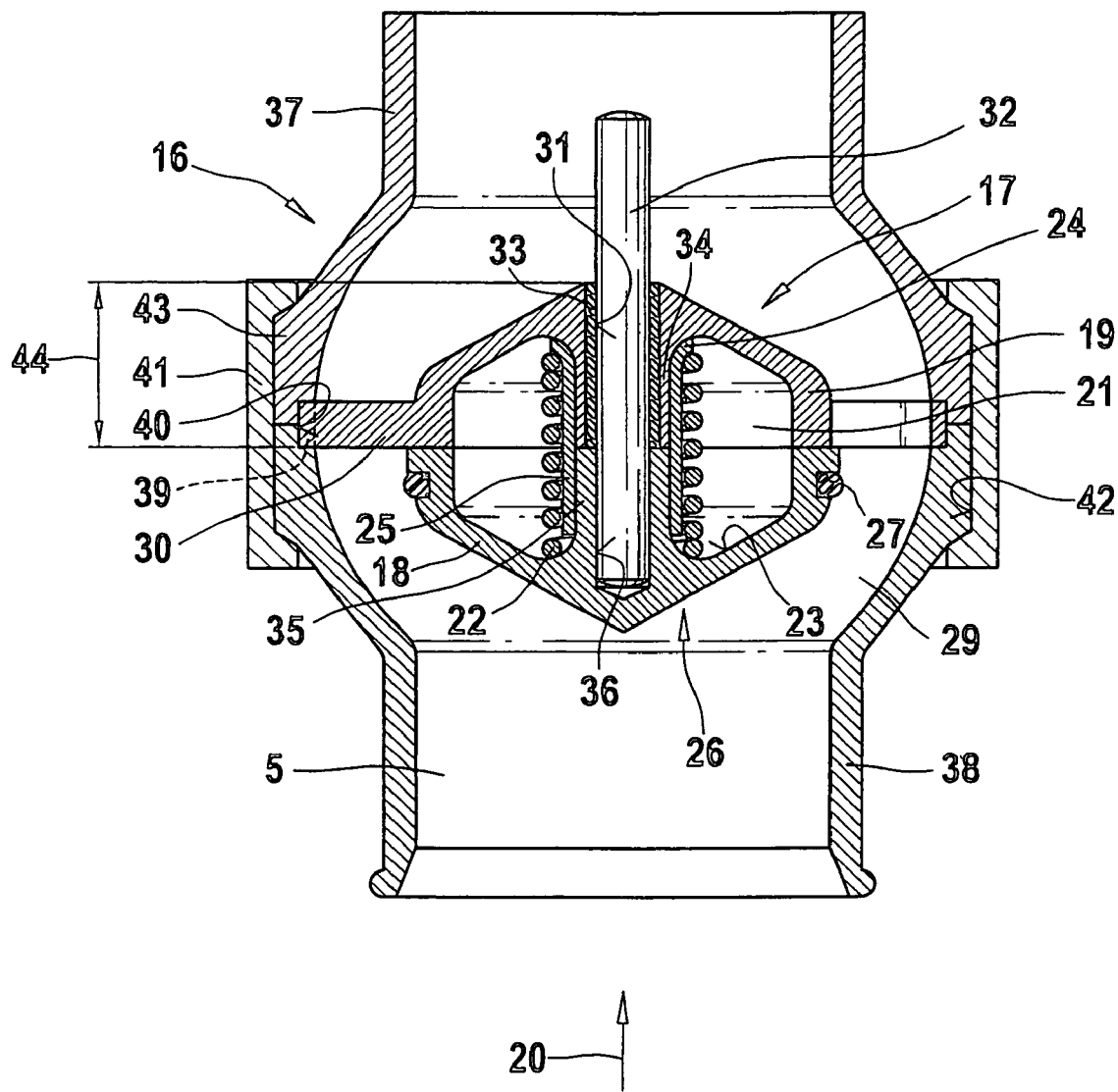
FIG. 2 illustrates an embodiment of a self-actuating valve with a displacement body accommodated therein.

FIG. 2 depicts an opened self-actuating valve.

Self-actuating valve 6 comprises a valve housing 16 with a displacement body 17 accommodated therein. Displacement body 17 is divided into a first displacement part 18 and a second displacement part 19. First displacement part 18 faces the upstream side, i.e., the side of displacement body 17 first impinged on by the flow of fresh air. The inflow direction is indicated by the arrow marked with reference numeral 20.

Formed between first displacement part 18 and second displacement part 19 is a cavity 21 in which a resilient element 22 is accommodated. Resilient element 22 is preferably a spiral spring implemented as a pressure spring.

Resilient element 22 bears with one end against an inner face 23 of first displacement part 18 and with the second end against a shoulder 24 of a bushing 25 that is connected to second displacement part 19.

The flow is incident on first displacement part 18 at an upstream side 26 that is opposite inner face 23 of first displacement part 18. The air striking this upstream side 26 exerts a pressure force on first displacement part 18. As long as the pressure force on the upstream side 26 of first displacement part 18 is greater than the biasing force of resilient element 22 exerted on the inner face 23 of first displacement part 18, compressor bypass 5 is open. As the pressure of the air in compressor bypass 5 decreases, so does the pressure force on the upstream side 26 of first displacement part 18. As soon as the pressure force on upstream side 26 is lower than the biasing force of resilient element 22, first displacement part 18 moves against the inflow direction 20 of the air and is placed, with a sealing element 27, in a closure seat 28 (cf. FIG. 3).

As the pressure of the air in compressor bypass 5 increases, so does the pressure force on upstream side 26. As soon as the pressure force on upstream side 26 is greater than the biasing force of resilient element 22, first displacement part 18 lifts out of its closure seat 28 and opens compressor bypass 5. The fresh air then flows around displacement body 17 into a throat 29 formed between displacement body 17 and valve housing 16.

Second displacement part 19 is held in valve housing 16 by bridges 30. Said bridges 30 have, for example, a rectangular, triangular, circular or teardrop-shaped cross section, or any other cross section known to those skilled in the art. In a preferred embodiment, the cross section of the bridges 30 is configured as teardrop-shaped, the fresh air being incident on the semicircular end of the teardrop-shaped bridge 30. The bridge 30 is thereby configured in a particularly flow-promoting manner in the inflow direction.

Fashioned in second displacement part 19 is a bore 31 in which a guide pin 32 is movably received. First displacement part 18 is fixed to guide pin 32 at the end facing upstream side 26. The connection of guide pin 32 to first displacement part 18 can be made in a force-locking or a form-locking manner. Thus, the connection can be effected, for example, by shrinking, as a press fit, as a screw connection, as a glued joint or as a welded joint. Guide pin 32 is preferably connected to first displacement part 18 by shrinking.

The length of guide pin 32 is so calculated that when compressor bypass 5 is closed, a large enough segment of guide pin 32 remains accommodated in bore 31 so that it cannot tilt or drop out of bore 31. In order for first displacement part 18 to be moved in inflow direction 20 or against inflow direction 20, bore 31 is preferably oriented parallel to inflow direction 20. A bushing 33 in which guide pin 32 is guided is preferably accommodated in bore 31. Bushing 33 is preferably made of a static-friction-reducing material, for example PTFE, to improve the sliding properties of guide pin 32.

In the embodiment shown here, a chuck 34 that projects into cavity 21 is formed on second displacement part 19. Said chuck 34 prolongs the bore 31 that receives guide pin 32. The prolonged bore 31 increases the guide length of guide pin 32 in bore 31, thereby ensuring that guide pin 32 will not tilt in bore 31.

As on second displacement part 19, a chuck 35 that projects into cavity 21 is also formed on first displacement part 18. Fashioned in chuck 35 is a bore 36 that receives guide pin 32. In bore 36, guide pin 32 is connected to first displacement part 18 in a force-locking or form-locking manner.

Bushing 25 embraces chuck 34 on second displacement part 19. Bushing 25 is preferably fastened force-lockingly to chuck 34 of second displacement part 19, for example by means of a screw connection. The biasing force of resilient element 22 can be adjusted by means of the position of shoulder 24, which, for example, can be moved toward or away from first displacement part 18 by a screwing movement of screwed-on bushing 25. As the distance between shoulder 24 and the inner face 23 of first displacement part 18 decreases, the biasing force in resilient element 22 increases. As the biasing force of resilient element 22 increases, greater force and thus a higher pressure in compressor bypass 5 on the upstream side 26 of first displacement part 18 are needed to open compressor bypass 5.

For installation purposes, valve housing 16 is preferably divided into a first housing part 37 and a second housing part 38. Valve housing 16 is preferably divided at the position of accommodation of a retaining ring 39 to which the bridges 30 of second displacement part 19 are connected. Retaining ring 39 is received by a groove 40 in valve housing 16. To permit assembly, one portion of groove 40 is formed in first housing part 37 and the other in second housing part 38. Fitting the housing parts 37, 38 together causes the cross section of groove 40 to assume the same shape as the cross section of retaining ring 39. After the assembly of housing parts 37, 28 [sic] and second displacement part 19 with retaining ring 39 mounted thereon via bridges 30, the valve housing 16 is embraced by a band clamp 41, for example a V-band clamp or any other band clamp known to those skilled in the art.

A groove 42 is formed in band clamp 41 and a collar 43 is formed on valve housing 16. The cross section of collar 43 and the cross section of groove 42 are the same. So that housing parts 37, 38 can be joined to each other by means of band clamp 42, the collar 43 is formed half in first housing part 37 and half in second housing part 38. Thus, fitting the housing parts 37, 38 together produces collar 43, whose cross section matches that of groove 43 in band clamp 41. A durable connection of first housing part 37 to second housing part 38 is achieved by force- or form-locking connection with band clamp 41.

Figure 3:
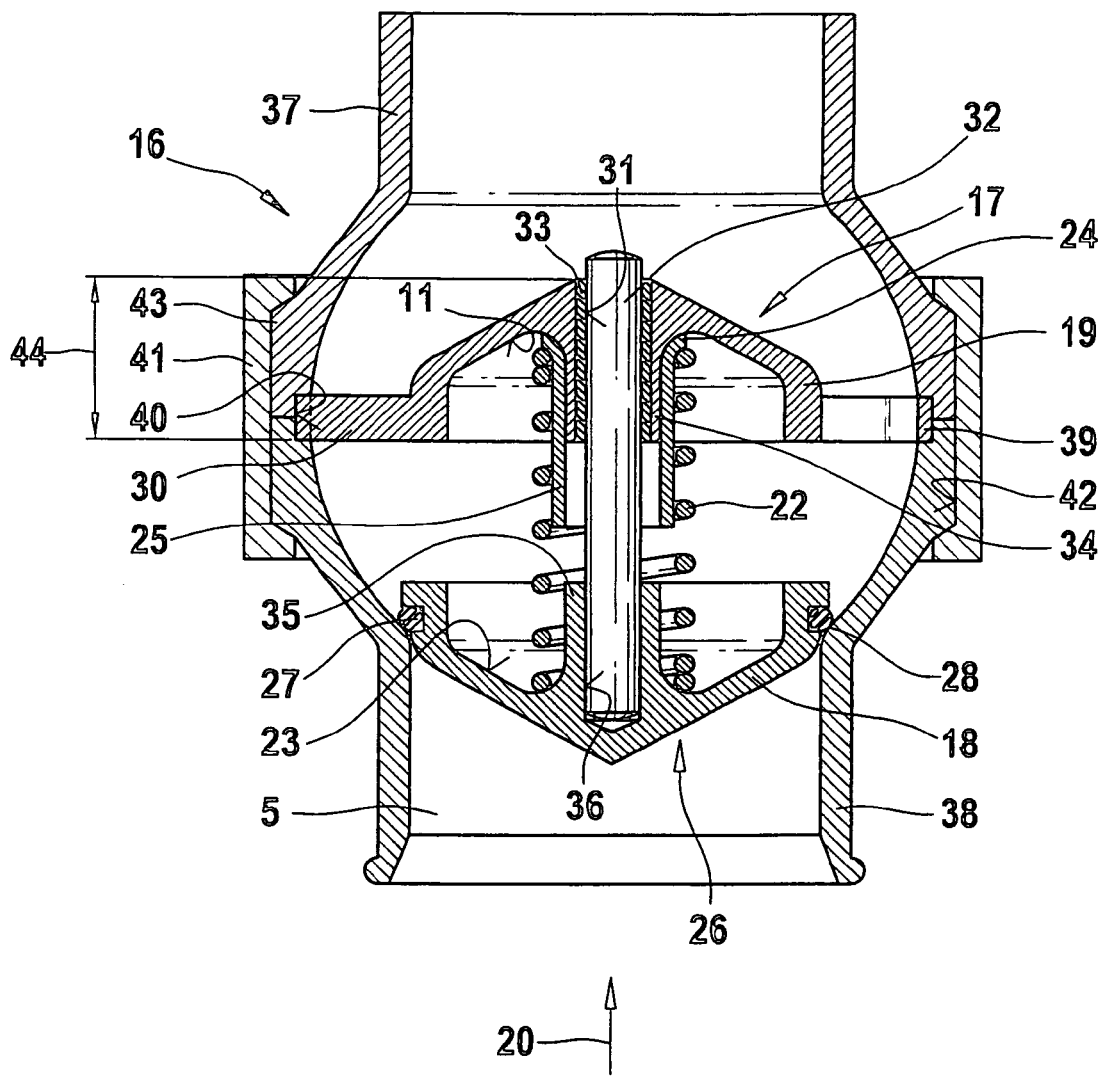
FIG. 3 shows the valve of FIG. 2 with the compressor bypass closed.

FIG. 3 shows a closed self-actuating valve according to FIG. 2. As long as the pressure of the fresh air in the compressor bypass 5 is so low that the pressure force acting on upstream side 26 is lower than the biasing force of resilient element 22, first displacement part 18 is positioned with sealing element 27 in closure seat 28. As soon as the pressure of the fresh air in compressor bypass 5 is so great that the pressure force on upstream side 26 becomes greater than the biasing force of resilient element 22, first displacement part 18 lifts out of closure seat 28 and thereby opens compressor bypass 5. To keep resilient element 22 from bending while being compressed during the movement of first displacement part 18 toward second displacement part 19, bushing 25 embraces resilient element 22. An enlarged bearing surface of resilient element 22 on bushing 25 is obtained by the fact that bushing 25 protrudes beyond chuck 34. Chuck 35 on first displacement part 18 is shaped so that it is received by bushing 25 and embraced by bushing 25 when compressor bypass 5 is open. When chuck 25 [sic] is inserted into bushing 25, a cushion of air that damps the movement of first displacement part 18 forms inside bushing 25 between chuck 34 on second displacement part 19 and chuck 35 on first displacement part 18. This prevents first displacement part 18 from striking sharply against second displacement part 19, and thus any potential rebounding.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for multi-stage supercharging an internal combustion engine, said engine including a supercharging system, said method comprising steps of:
routing fresh air through a low-pressure compressor (2);
routing at least a portion of the compressed air stream through a high-pressure compressor (4) and the rest of the fresh air compressed in said low-pressure compressor (2) through a compressor bypass (5) around said high-pressure compressor (4);
feeding all of said fresh air to the internal combustion engine (8), wherein said compressor bypass (5) is one of unblocked and closed by an automatic valve (6) as a function of the differential pressure across said high-pressure compressor (4), and said automatic valve (6) opening as soon as the pressure downstream of said valve (6) is lower than the pressure upstream of said valve (6) by a predetermined pressure differential which is a characteristic of said valve, said automatic valve (6) comprises a displacing body (17) received in a valve housing (16), said body comprising a movable first displacing part (18), a second displacing part (19) and a valve seat, said second displacing part (19) connected to said valve housing, said movable first displacing part (18) faces the inflow side of said valve and is movably guided by said second displacing part (19) to thereby one of closing and unblocking said compressor bypass (5), said displacing part including a spring element (22) for biasingly urging said first displacing part (18) onto said valve seat when said pressure differential is set to a value higher than zero and lower than 100 mbar, said automatic valve (6) further comprising a first plug (34) configured on said second displacing part (19) and a second plug (35) configured on said first displacing part (18), said second plug (35) is shaped so that it is received by a sleeve (25) and embraced by said sleeve (25) when said compressor bypass (5) is open, whereby when said first displacing part (18) moves toward said second displacing part, said second plug (35) is inserted into said sleeve and an air cushion is formed inside said sleeve (25) between said first plug (34) and said second plug (35) for damping the movement of said first displacing part (18).

2. The method of claim 1 further comprising the step of cooling said fresh air in a first heat exchanger (3) after being compressed in said low-pressure compressor (2).

3. The method of claim 1 further comprising the step of cooling said fresh air in a second heat exchanger (7) before entering said internal combustion engine (8).

4. The method of claim 1 wherein said high-pressure compressor (4) is actuated by a high-pressure turbine (9) and said low-pressure compressor (2) is actuated by a low-pressure turbine (12).

5. The method of claim 4 wherein said high-pressure turbine (9) and said low-pressure turbine (12) are driven by a stream of exhaust gas from said internal combustion engine (8).

6. The method of claim 5 wherein a portion of said exhaust gas is routed past said high-pressure turbine (9) through a high-pressure bypass (10) and a portion of said exhaust gas is routed past said low-pressure turbine (12) through a low-pressure bypass (13).

\* \* \* \* \*